July 11, 1944.   E. A. BINNEY   2,353,436
DRIVING MEANS FOR ELECTRICALLY PROPELLED VEHICLES
Filed Feb. 10, 1942   3 Sheets-Sheet 1
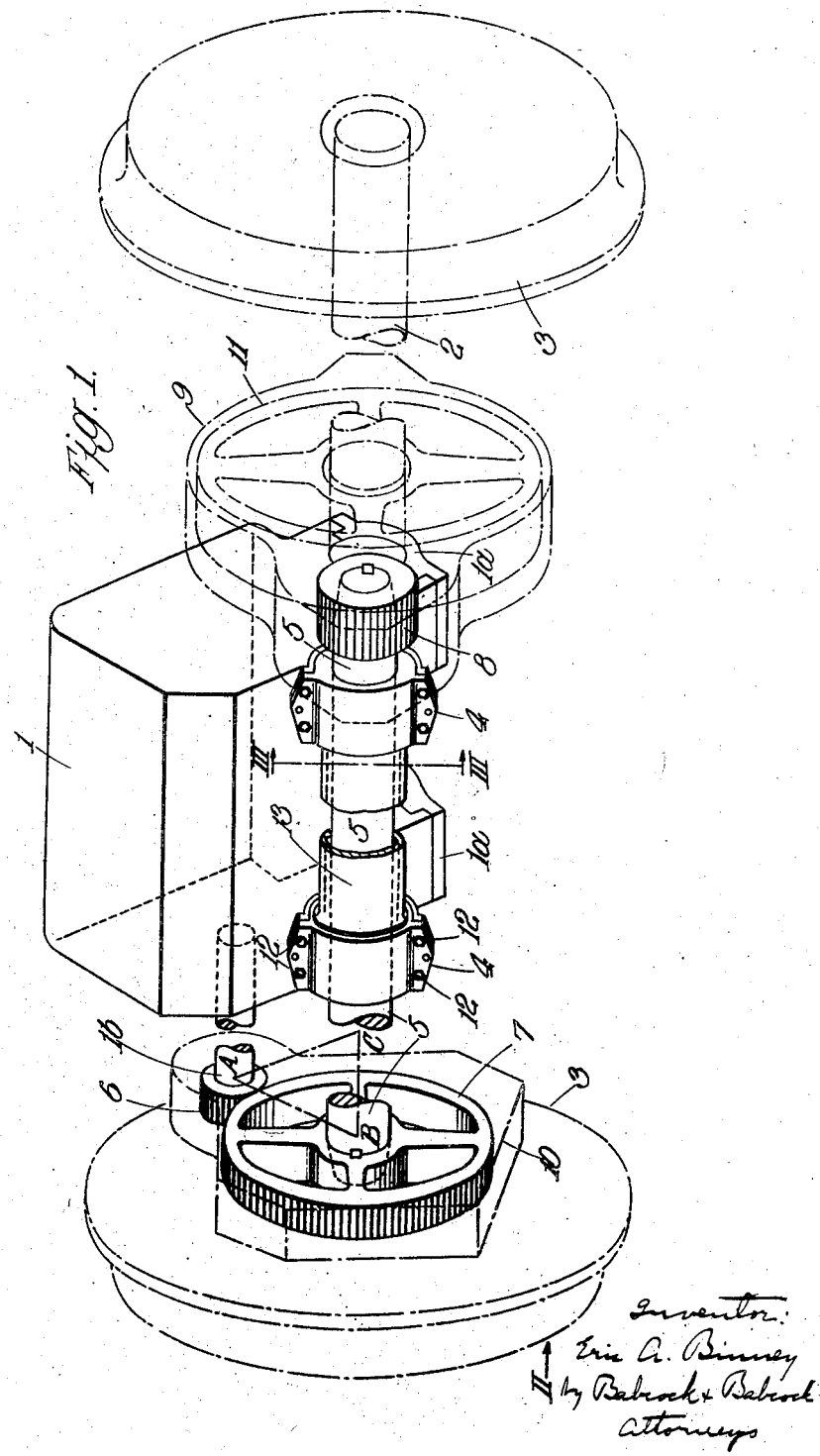

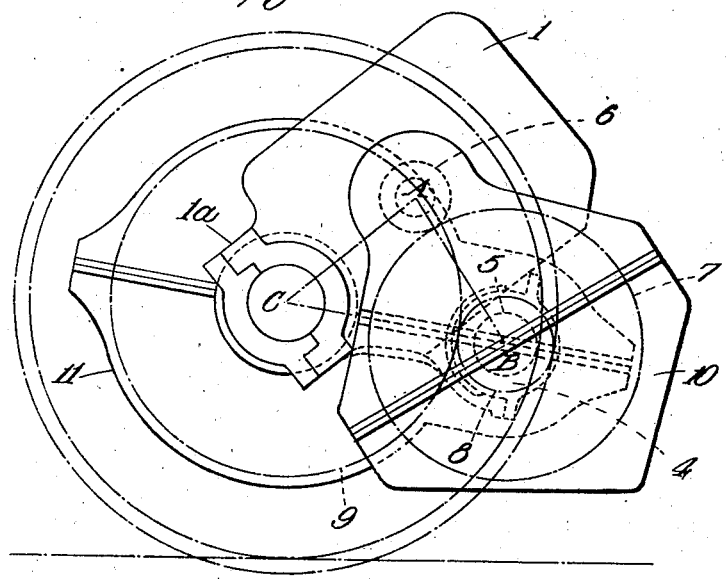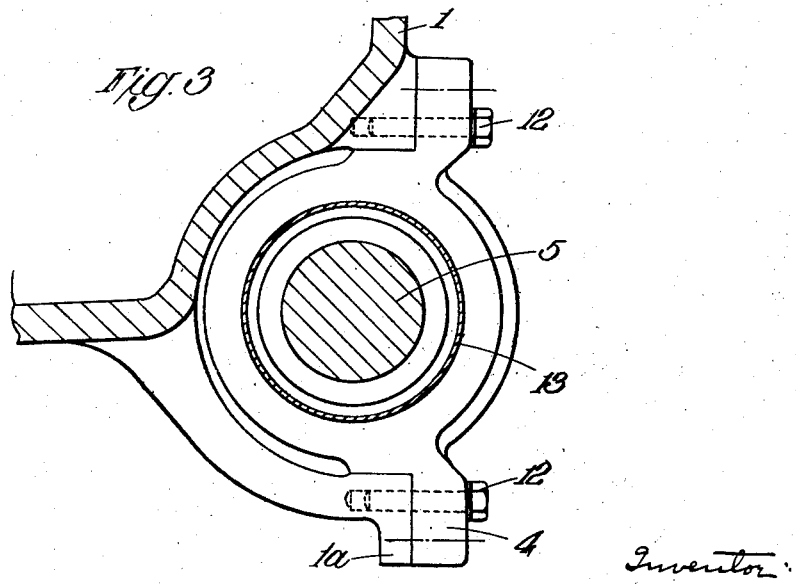

July 11, 1944.  E. A. BINNEY  2,353,436
DRIVING MEANS FOR ELECTRICALLY PROPELLED VEHICLES
Filed Feb. 10, 1942  3 Sheets-Sheet 3
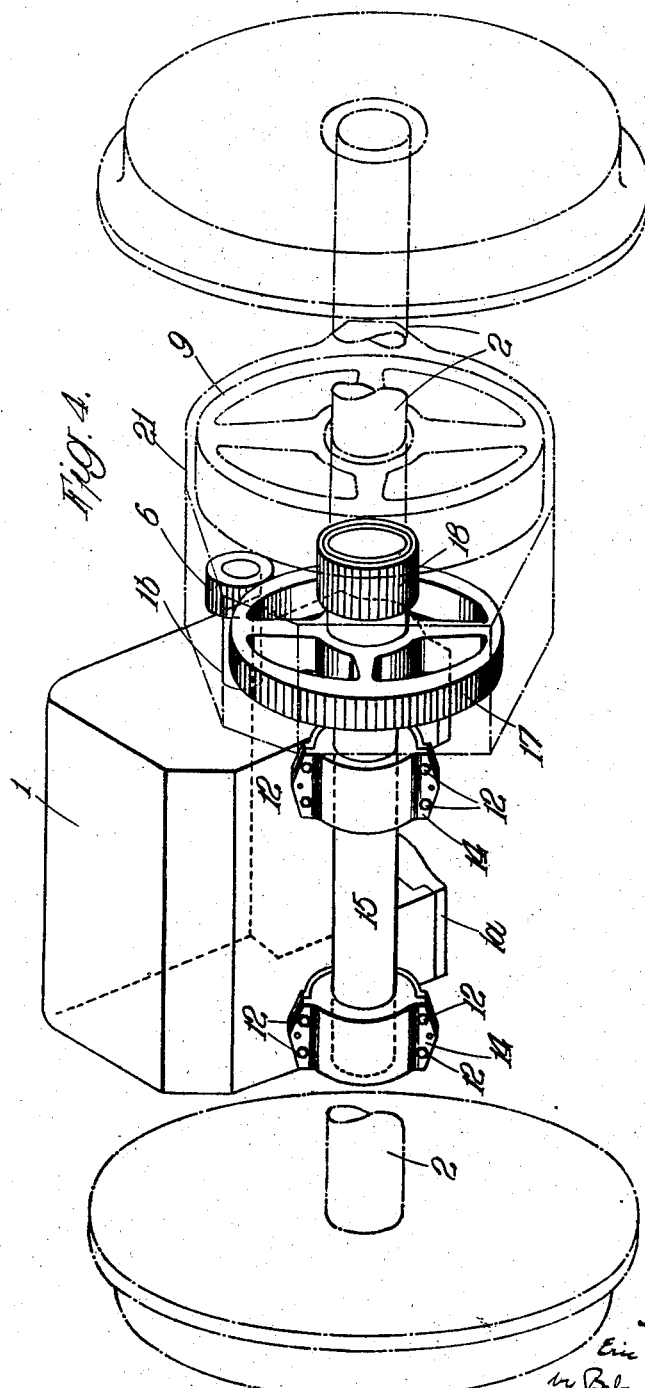

Patented July 11, 1944

2,353,436

UNITED STATES PATENT OFFICE 2,353,436

DRIVING MEANS FOR ELECTRICALLY PROPELLED VEHICLES

Eric Alton Binney, Curly Hill, England, assignor to The English Electric Company Limited, London, England, a British company Application February 10, 1942, Serial No. 430,313
In Great Britain January 15, 1941

1 Claim. (Cl. 105—113)

This invention is concerned with a driving unit for an electrically propelled vehicle, the unit comprising an electric motor which can be suspended on the vehicle axle and reduction gearing through which the motor can drive a gear wheel secured to the axle.

According to the invention a wheel of the gear train is carried by an intermediate shaft supported on said motor, the axes of the motor shaft, of the said intermediate shaft and of the said suspension bearings being parallel but not coplanar—i. e. these three axes pass through three points on a transverse plane which if joined form a triangle. The motor shaft can conveniently lie above and immediately between the axle and the intermediate shaft.

In prior constructions an axle-suspended motor driving the axle through double reduction gearing has been substantially horizontal; this has led to unsatisfactory arrangements taking up considerable room as compared with an arrangement according to the central feature of this invention in which the motor is tilted upwards to bring the motor armature axis above the axis of the suspension bearings on the axle.

One construction of driving unit in which a pinion situated at one end of the motor and a gear wheel at the other end are secured to an intermediate rotary shaft carried in bearings mounted wholly on the motor frame is shown in relationship to the vehicle wheels and axle in Figs. 1 and 2 of the accompanying drawings of which Fig. 1 is an oblique view of the complete unit and Fig. 2 an end view looking on the unit in the direction of the arrow II; Fig. 3 is a section through the intermediate shaft bearing on the line III—III. Fig. 4 of the accompanying drawings is a view corresponding to Fig. 1 but of a modification in which a pinion and gear wheel secured together are mounted on an overhanging stationary stub shaft at one end of the motor.

In Figs. 1, 2 and 3 the frame of the motor 1 carries the suspension bearings 1a by which the motor can be mounted on the vehicle axle indicated in dot and dash lines at 2; the vehicle wheels are similarly indicated at 3. The motor 1 is supported from the vehicle frame by conventional means (not shown). The motor shaft 1b extends from the left hand end of the motor. Mounted on the frame 1 are the two bearings 4 for an intermediate shaft 5 which extends along the length of the motor. A pinion 6 is secured to and rotatable with the end of the motor shaft 1b; a gear wheel 7 is secured to and rotatable with the left hand end of the intermediate shaft 5 and meshes with the pinion 6. For clearness the drawings show shafts 1b and 5 extended and broken and the gearing 6 and 7 and the vehicle wheel 3 displaced to the left, but it will be appreciated that the gearing will actually be located immediately at the end of the motor. A pinion 8 is secured to and rotatable with the right hand end of the intermediate shaft 5.

The bearings 4 and the suspension bearings 1a are so located on the motor frame that the axes of the suspension bearings 1a, of the bearings 4 and of the motor shaft 1b are parallel but not co-planar—i. e. lines joining the ends of these axes as they appear in Fig. 2 form a triangle ABC, and the distance between the axis of said armature and said other axis is reduced to the minimum as limited by the motor frame. In the particularly convenient arrangement shown, the line AC is approximately at right angles to the line AB.

When this driving unit is mounted on the axle the pinion 8 can mesh with a gear wheel 9 secured to and rotatable with the axle 2. A gear box (indicated in dot and dash lines at 10) can enclose the gearing 6 and 7 and a gear box (indicated in dot and dash lines at 11) can enclose the gearing 8 and 9. Since the bearings are carried wholly by the frame of the motor 1, these gear boxes can be of simple sheet metal construction.

The invention has the advantage of permitting the use of double or multiple reduction gearing so that for a given horse-power and axle speed the motor speed can be higher than with hitherto known arrangements having only single reduction gearing between the motor shaft and the axle; the increase in motor speed allows the weight and bulk of the motor to be decreased, the motor and train of gearing being accommodated readily in the space normally taken by a correspondingly larger motor running at a slower speed and combined with a single reduction drive. The non-coplanar or triangular relationship of the axes of the axle 2 and the shafts 1b and 5 provides for a maximum possible gear ratio in substantially the minimum possible space. The exceptionally close contiguity of the axle 2 and intermediate shaft 5 to the motor frame provides a very rugged construction, the intermediate shaft 5 being rigidly supported and accurately located relatively to both the motor shaft 1b and the axle 2, while the bearings 1a on said axle are hard up against the motor frame. This has the result that the distance between the axle 2 and the suspension lug 1c is kept to a minimum, thus ensuring maximum rigidity of frame structure. Furthermore, by outward movement of the bearings 4 on the motor frame 1 it is possible to withdraw the shaft 5 in a direction away from the axle 2 and the motor shaft 1b, thereby disengaging gear wheel 7 from pinion 6 and pinion 8 from gear wheel 11; this allows the vehicle to be coupled to and drawn by another vehicle at a speed greater than its normal speed without the motor 1 being driven at high speed from the axle. As shown in Figs. 1 and 3, the bearings 4 completely embracing the shaft 5 are normally secured to the frame of the motor 1 by the screws or tap bolts 12; by unscrewing these screws and inserting and screwing set screws (not shown) in the tapped holes 4a, the bearings together with the shaft 5 can be withdrawn in a direction away from the axle 2 along the line CB (Fig. 2). The intermediate shaft 5 may be enclosed by a tubular cover 13 attached to and extending between the bearings 4; this cover is shown partly broken away in Fig. 1 to expose the shaft 5.

In the modification shown in Fig. 4 the motor shaft 1b carrying the pinion 6 extends from the right hand end of the frame of the motor 1. The gear wheel 17 meshing with pinion 6 is secured to a second pinion 18. The unit formed by gear wheel 17 and pinion 18 is rotatable on bearings on a stationary stub shaft 15 carried by supports 14 secured to the frame of the motor 1 in the same manner as the bearings 4 in Figs. 1 and 3 so that the stub shaft 15 and the gearing 17 and 18 can be withdrawn. When this driving unit is suspended by suspension bearings 1a on the axle 2, the pinion 18 meshes with the gear wheel 9 on the axle. A gear box 21 surrounding the train of gearing can again be of simple sheet metal construction since it does not have to incorporate bearings which would be necessary if the wheel 17 and pinion 18 were secured to a rotatable shaft having one end carried in a bearing on the motor.

What I claim as my invention and desire to secure by Letters Patent is:

A driving unit for the axle of a vehicle comprising in combination an electric driving motor including an armature and frame, bearings on one side of said motor frame for suspending the motor from the vehicle axle, an intermediate shaft with its axis parallel to but not co-planar with the axes of said armature and said suspension bearings, the axis of the armature lying above and between said other two axes, a train of gearing including a pinion rotatable with said armature and a gear wheel on said intermediate shaft meshing with said pinion and lastly a support for said intermediate shaft movably mounted on said motor frame and movable in a direction away from both the armature and the said suspension bearings.

ERIC ALTON BINNEY.